United States Patent [19]

Nakamura et al.

[11] Patent Number: 4,872,247
[45] Date of Patent: Oct. 10, 1989

[54] COMBINATION ROLL

[75] Inventors: Hironori Nakamura, Fujimi; Toshiaki Yotsui, Kawasaki; Youichi Sato, Ichihara; Toshiaki Umetsubo, Fuji; Hideo Ohkawa, Higashimatsuyama, all of Japan

[73] Assignee: CALP Kogyo Kabushiki Kaisha, Tokyo, Japan

[21] Appl. No.: 209,480

[22] PCT Filed: Mar. 26, 1987

[86] PCT No.: PCT/JP87/00183
§ 371 Date: Jun. 22, 1988
§ 102(e) Date: Jun. 22, 1988

[87] PCT Pub. No.: WO88/01977
PCT Pub. Date: Mar. 24, 1988

[30] Foreign Application Priority Data

Sep. 9, 1986 [JP] Japan ............. 61-138406[U]
Sep. 9, 1986 [JP] Japan ............. 61-138407[U]

[51] Int. Cl.4 ............................................. B21B 31/00
[52] U.S. Cl. ............................................. 29/125; 29/110
[58] Field of Search ................. 29/125, 110, 124; 226/190, 191, 192

[56] References Cited

U.S. PATENT DOCUMENTS

| 769,680 | 9/1904 | Bredannaz | 29/125 |
| 776,796 | 12/1904 | Perkins | 29/125 |
| 3,964,658 | 6/1976 | Edwards | 29/125 |
| 4,010,528 | 3/1977 | Böhmer | 29/125 |
| 4,457,058 | 7/1984 | Binder et al. | 29/125 |
| 4,542,566 | 9/1985 | Sukenik | 29/125 |

FOREIGN PATENT DOCUMENTS

| 11-7229 | 5/1936 | Japan . |
| 36-2743 | 2/1961 | Japan . |
| 40-1184 | 1/1965 | Japan . |
| 5132046 | 9/1980 | Japan . |
| 58-30640 | 2/1983 | Japan . |
| 8109353 | 6/1983 | Japan . |
| 258049 | 12/1985 | Japan . |
| 61-8034 | 3/1986 | Japan . |
| 61-41118 | 3/1986 | Japan . |

Primary Examiner—P. W. Echols
Assistant Examiner—Irene Cuda
Attorney, Agent, or Firm—W. Edward Johansen; Kenjiro Hidaka

[57] ABSTRACT

A combination roll has a roll shaft and a plurality of roll units mounted on the roll shaft. The roll units include an end roll unit which can be locked to the roll shaft. Each of the roll units comprises a roll portion formed with a contact portion and a shaft inserting portion which has engaging means at each of opposite ends thereof. The diameter of the shaft inserting portion is less than the diameter of the roll portion. All of the roll units are engaged by the engaging means, thereby forming an assembled roll, and are locked to the roll shaft through the end roll unit.

2 Claims, 5 Drawing Sheets

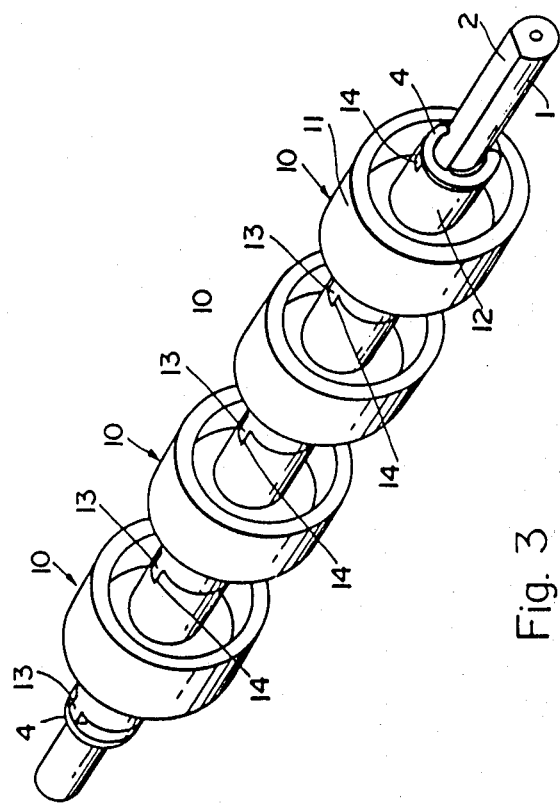
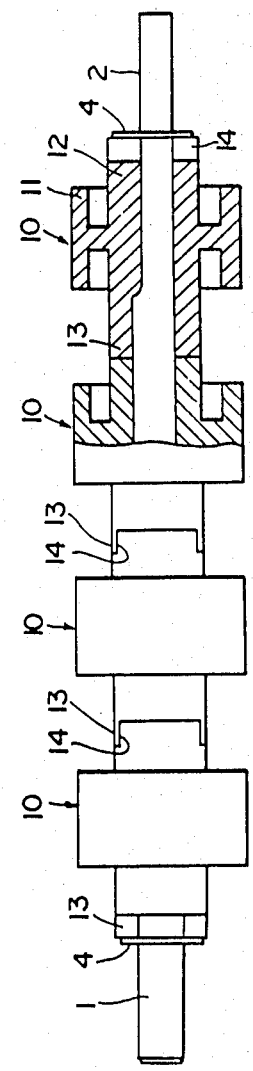
Fig. 2
Fig. 3

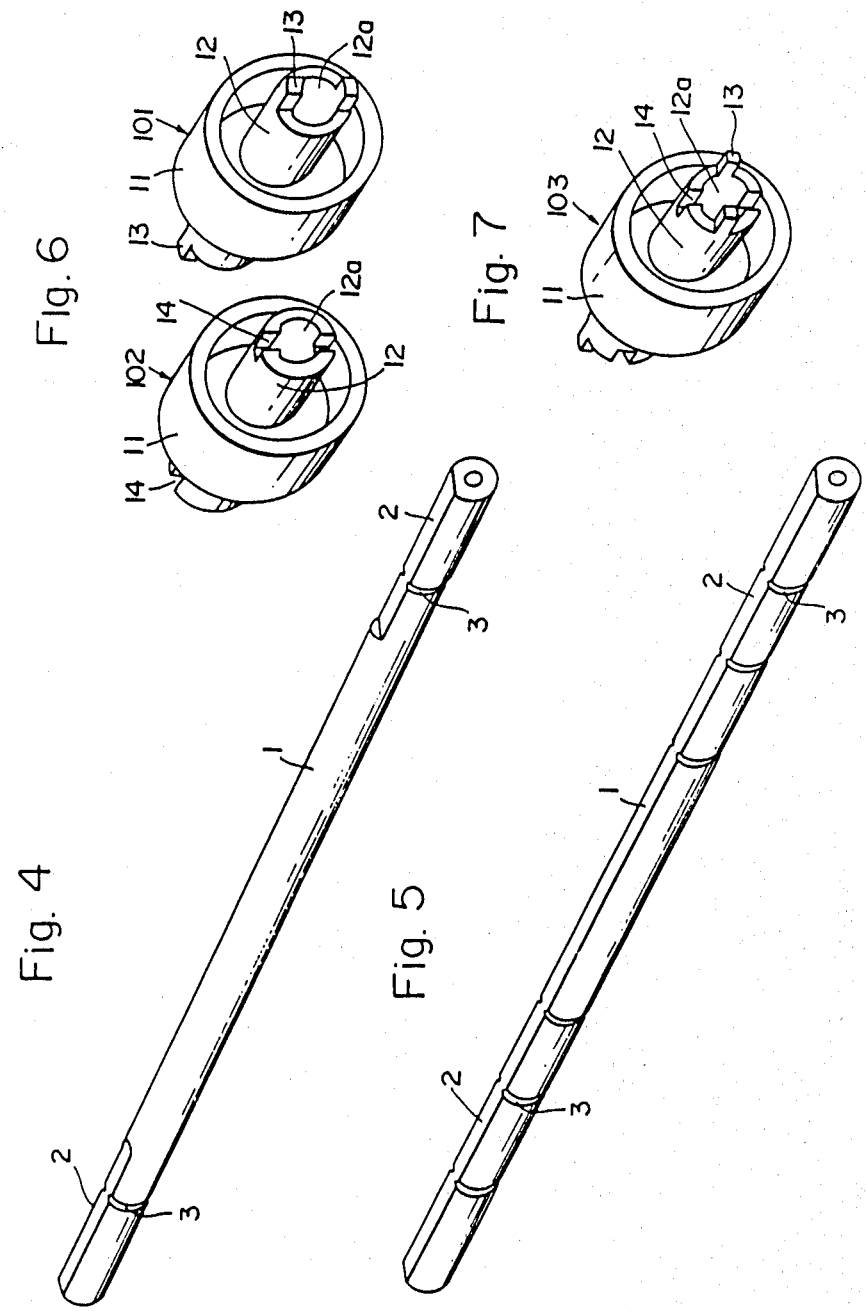

COMBINATION ROLL

BACKGROUND OF THE INVENTION

1. Field of the Invention

This invention generally relates to a combination roll, and more particularly, to a roll unit for constituting the combination roll and the combination roll or roll assembly formed of a plurality of roll units.

The term "roll" used herein broadly means a member having a roll shaft and an outer peripheral contact or operative portion, which is integral, in operation, with the roll shaft so as to rotate conjointly with the roll shaft. The term "roll" herein used includes rolls employable in various machines for manufacturing, processing or using a sheet or film material such as a synthetic resin sheet or film, paper, etc. or various feed rolls or wind-up rolls usable in business machines, or print rolls.

2. Description of the Prior Art

Conventionally, various machines, for example, for handling a film or a sheet material of a synthetic resin, or paper or fabric, use rolls for winding up or feeding the material or the product.

In general, such rolls include a roll formed continuously and integrally and a combination roll which is formed of a plurality of roll portions in sections of short lengths, which are combined to form a roll assembly. These two kinds of rolls are chosen according to the uses or necessity. However, the continuous roll has such disadvantages that it can not cope with a change in width of the product; it is difficult to be manufactured and heavy in weight; it has a large contact area, which produces a large frictional resistance and accordingly causes, for example, wrinkles or static electricity on the product. Therefore, for the use in which these disadvantages do matter, a combination roll formed of a plurality of roll portions of short lengths, which is free from these problems, is chosen.

On the other hand, the roll portions of a short length constituting the conventional combination roll comprises a contact portion and a shaft inserting portion which are made of a synthetic resin or rubber and an insert member of a metallic material which is fitted in the shaft inserting portion. These roll portions must be mounted on and fixed to the roll shaft by setting screws into threaded holes formed in the metallic insert member for each of the roll portions.

Thus, in the conventional combination roll, a plurality of roll portions must be fixed to the roll shaft by setting the screws into the screw holes formed in the metallic insert member of the shaft inserting portion for each of the roll portions. Therefore, it is very troublesome or bothersome to mount or remove the roll portions onto or from the roll shaft. For this reason, it can not, after all, be easy to adjust the entire width of the roll even though the number of the roll portions is changeable.

Furthermore, as each of the roll portions constituting the combination roll is made of a synthetic material and a metallic material, the shaping of the roll portions and the insertion of the metallic insert member should be carried out in separate steps. This necessitates extra steps and costs for the manufacturing of the rolls.

The present invention has been made to obviate the above-mentioned problems, and it is in object of the present invention to provide a roll unit and a roll assembly, which are capable of simplifying the steps in fixing plural roll portions to a roll shaft and capable of facilitating the adjustment of the entire roll width of the combination roll, and capable of easily forming the roll portions only from, for example, a synthetic resin, reducing the weight of the roll portions.

SUMMARY OF THE INVENTION

In accordance with the present invention, there is provided a roll unit for a combination roll, including a shaft inserting portion having a hole formed, at a central portion thereof, for accepting a roll shaft therethrough and a roll portion formed integrally with said shaft inserting portion and having, at an outer circumferential periphery thereof, a roll contact portion or operative portion, which roll unit for a combination roll comprises engaging means provided, at opposite ends of the shaft inserting portion, for respectively engaging with corresponding ends of a shaft inserting portion of a roll unit which is to be combined.

Further according to the present invention, there is provided a combination roll including a roll shaft and a plurality of roll units mounted on the roll shaft, in which said roll units each comprise a roll portion formed with a contact portion and a shaft inserting portion concentric with said roll portion, said shaft inserting portion having, at its opposite ends, engaging means engageable with corresponding shaft inserting portion of each of adjacent roll units, and which combination roll further comprises a locking means for locking said shaft inserting portion to the roll shaft inserted through said shaft inserting portion so as to rotate the shaft inserting portion conjointly with the roll shaft.

BRIEF DESCRIPTION OF DRAWINGS

FIG. 2 is a perspective view of the combination roll complete of the embodiment, shown in its assembled state;

FIG. 3 is a partly centrally sectioned view of the combination roll of FIG. 2;

FIGS. 4 and 5 are perspective views each showing a modified form of a roll shaft;

FIGS. 6 and 7 are perspective views each showing a modified form of a roll unit;

DESCRIPTION OF THE PREFERRED EMBODIMENTS

Figure 1:
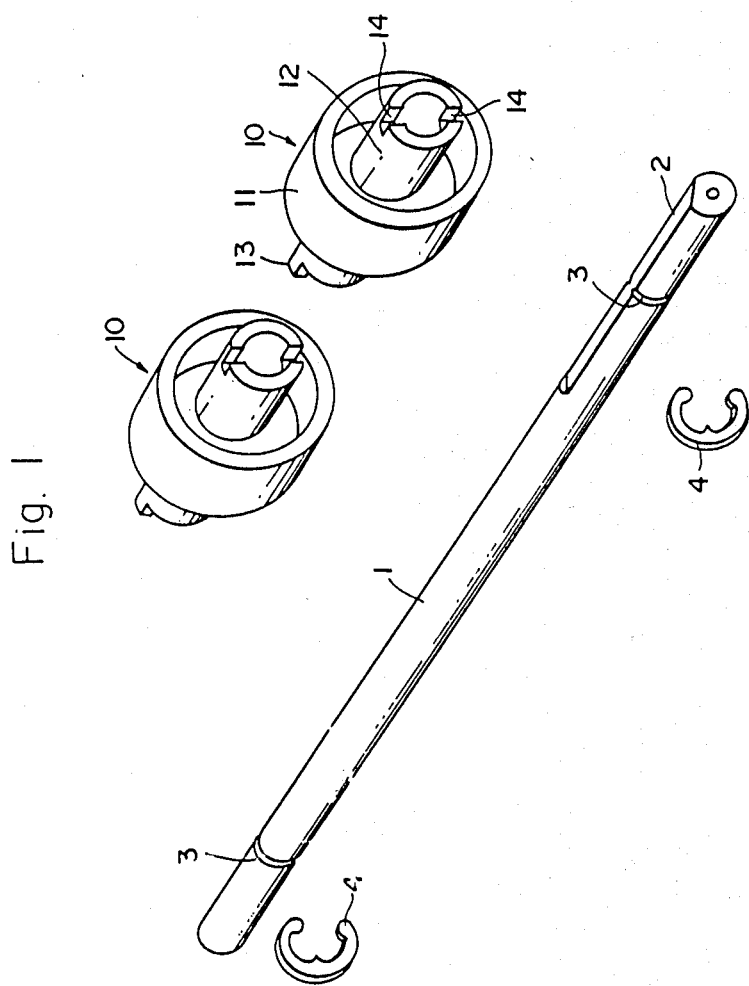
FIG. 1 is a perspective view of elements constituting a combination roll according to a first embodiment of the present invention.

Some embodiments of the present invention will now be described, referring to the drawings.

First Embodiment

FIG. 1 is a perspective view of elements constituting a combination roll according to a first embodiment of the present invention, FIG. 2 is a perspective view of the combination roll in full, showing it in the assembled state, and FIG. 3 shows a partly centrally sectioned view of the combination roll of FIG. 2.

In these figures, 1 is a roll shaft having a circular configuration in section except for one end portion and formed, in continuous length, from aluminum, stainless steel, iron, ceramics or synthetic resins. The roll shaft 1 has an end portion 2 whose outer periphery is partly cust so as to form a D-shape in section. The roll shaft 1 further has grooves 3, 3 at opposite end portions thereof for receiving E-rings 4 therein. The spacing between these grooves 3, 3 is a length determined by the length of the number of roll units 10 combined as will be described in detail later and it has a length corresponding to the total length of four roll units 10 in the embodiment as illustrated.

Each of the roll units has, at the central portion thereof, a cylindrical contact portion or an operative portion 11 which is operative, for example, for feeding or winding up the product, and a shaft inserting portion 12 having a cylindrical through-hole concentric with the contact portion 11, at each of the opposite ends in the axial direction of the unit, around the rotational axis of the roll unit. The diameter of the shaft inserting portion 12 is less than the diameter of the contact portion 11. One end of the shaft inserting portion 12 has, on the peripheral end edge thereof, two engaging portions 13 at angular intervals of 180°, while the other end of the shaft inserting portion 12 has two engaging recesses 14 engageable with the engaging projections 13 of the adjoining roll unit at angular intervals of 180°.

A plurality of the roll units 10 are thus prepared and they are mounted on the roll shaft with the engaging projections 13 engaged with the corresponding engaging recesses 14 of the respective adjoining roll units, and the assembly of the roll units are pressed by the E-rings 4, 4 inwardly, to form a combined roll or a roll assembly having a desired width.

In this connection, it is to be noted in reference to FIGS. 2 and 3 that the through-hole of the shaft inserting portion 12 of the particular roll unit 10, which is located closest to the right (as viewed in FIGS. 2 and 3) end of the roll shaft 1 where the D-cut portion 2 is formed, has a sectional configuration of D-shape matching with the D-shape of the D-cut portion 2 of the roll shaft 1 so that this right-most (as viewed in FIGS. 2 and 3) roll unit 10 is directly locked to the roll shaft 1. Whereas all of the remaining roll units 10 are locked to the right-most roll unit 10 by means of the engaging projections 13 and the engaging recesses 14. Thus, all of the remaining roll units 10 mounted on the roll shaft 1 are indirctly locked to the roll shaft 1 through the right-most roll unit 10. Such a D-cut portion 2 is effective to easily and surely fix all of the roll units 10 to the roll shaft 1 and to surely transmit the driving force from the roll shaft 1 to all of the roll units 10.

The D-cut portion 2 formed on the roll shaft 1 is formed at one end portion of the roll shaft 1 in the above-mentioned embodiment, but it may be formed at both end portions of the roll shaft 1 as illustrated in FIG. 4. In this case, the lengths of the D-cut portions 2 in the axial direction thereof may be selected as desired. Alternatively, the D-cut portion may be formed all along the length of the roll shaft 1 as illustrated in FIG. 5. In reference to FIGS. 5 and 6, when the D-cut portion 2 is formed along the entire length of the roll shaft 1, all the roll units may be like the roll units 101, 102 having the same through-hole 12a with a D-shaped configuration in section and they may be placed at any position in an assembly when they are assembled. This enables the number of the kinds of the parts to be reduced and simplified and the adjusting operation in production to be facilitated.

The combination roll of the first embodiment is not limited to the structure as given above and it may, of course, include the following modifications.

(1) As denoted by numeral 101 in FIG. 6, one of the roll units constituting the combination roll may have, at opposite ends thereof, projections 13 and the other type, denoted by numeral 102, may have, at opposite ends thereof, recesses 14.

(2) As denoted by numeral 103 in FIG. 7, another type of the roll units may have, at the same end thereof, both the projections 13 and recesses 14 formed at equal angular intervals.

(3) More than two engaging portions may be provided at equal intervals at each of the opposite ends of the roll unit.

(4) A single engaging portion may be provided on each of the opposite end peripheral surfaces.

(5) Engaging portions may be provided all around the entire circle of each opposite end of the roll unit.

(6) The engaging portion at each of the opposite ends of the roll unit may be in a form other than the projection and recess, for example, in the form of serration.

(7) An anti-slip means may be provided on the contact portion 11 of the roll unit. The anti-slip means 11 may be formed by exposing a composite material, being exposed on the contact portion 11, which contains a resin and an inorganic filler, or by knurling.

(8) As shown in FIG. 5, a plurality of grooves 3, 3 for E-rings may be formed on each of the opposite sides of the roll shaft 1 at proper spaces. In this case, the number of the roll units to be combined may be freely selected and the setting position of the entire assembly of the roll units may be adjusted by using a single roll shaft.

Figure 8:
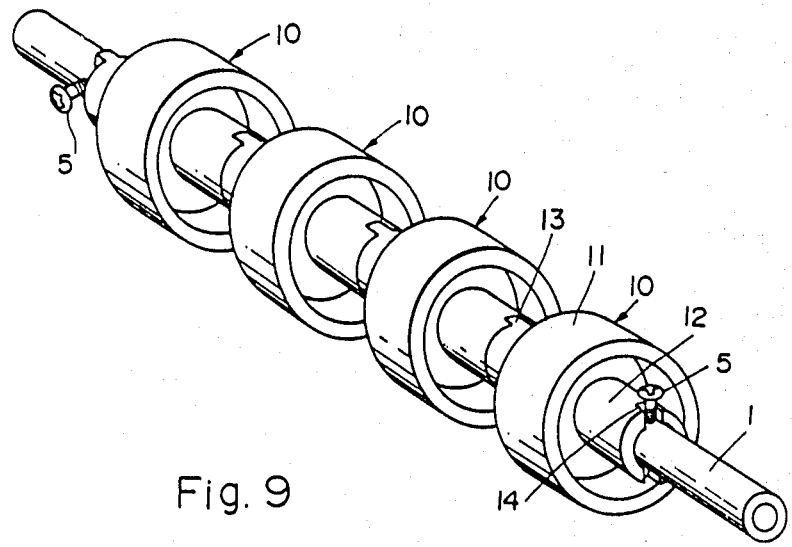
FIG. 8 is a perspective view of a modified embodiment of the invention which uses screws for fixing roll units to a roll shaft.

(9) The ends of the assembly of the roll units mounted on the roll shaft 1 may be fixed by screws. In this case, if one of the screws 5 is set in the roll shaft 1 within the recess 14, the D-cut portion 2 on the roll shaft 1 may be omitted (see FIG. 8).

(10) The locking portion may be formed in a configuration other than the D-cut, for example, in the form of oblong (Kobang-shape) with the opposing flattened surfaces on the shaft periphery.

(11) The opposite ends of the assembly of the roll units may be fixed by members other than the E-rings, for example, by screws.

Second Embodiment

In the foregoing embodiment, each of the roll units 10 has a contact portion or operative portion 11 at the central portion thereof and a cylindrical shaft inserting portion 12 concentric with the contact portion 11 which is projected outwardly in the axial direction at each of the opposite ends of the unit, around the rotational axis thereof. With this arrangement, it will be seen that when the roll units 10 are mounted on the roll shaft 1 and then assembled (FIG. 2 and FIG. 3), the roll surfaces formed by the contact portions 11 are intermittent.

Figure 9:
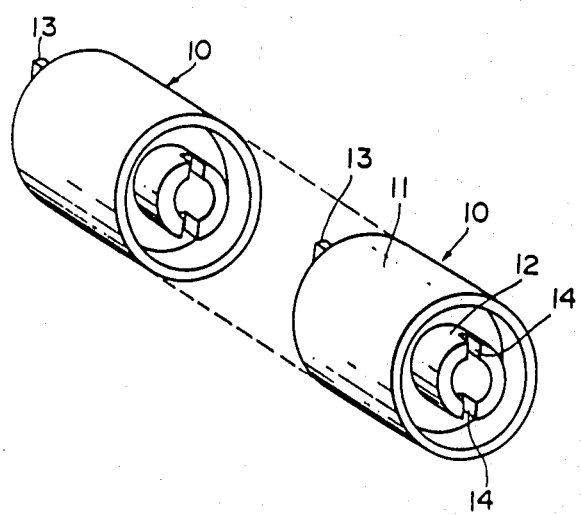
FIG. 9 is a perspective view of roll units employable in a second embodiment of the present invention.
Figure 10:
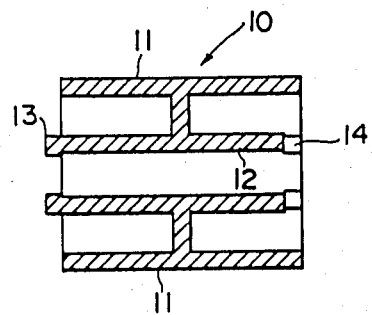
FIG. 10 is a sectional view of the roll unit shown in FIG. 9.
Figure 11:
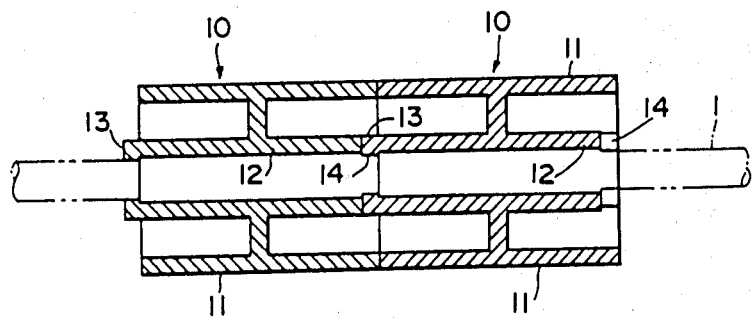
FIG. 11 is a sectional view of the roll units shown in FIG. 9 in the assembled state.

In contrast, for the uses which need a continuous, flush operative roll surface, such as a print roll, a combination roll of the present invention may be formed, for example, as illustrated in FIGS. 9 to 11.

The essential configuration of the second embodiment may be substantially the same as that of the first embodiment. This embodiment, however, is different from the first embodiment, in that the lengths in the axial direction of the shaft inserting portion 12 and the contact portion 11 are selected so that the contact portions 11 of the respective roll units 10 form a continuous, flush surface when the engaging portions 13 and 14 of the shaft inserting portions are engaged with each other.

For this purpose, the engaging portions 13 and 14 may be formed in the manner axially projected and recessed, respectively, from one end and the other end, respectively, of the contact portion 11, as shown in section in FIGS. 10 and 11. Of course, the projections and the recesses need not necessarily be aligned with the respective ends of the contact portion 11 so long as the engaging portions 13, 14 of the shaft inserting portions 12 are engageable with the respective inserting portions, while the corresponding ends of the contact portions are properly adjoined in a butting state.

Since the continuous, flush roll operative surface is formed of a plurality of separate roll units 10 assembled in the second embodiment, the width of the roll operative surface may be freely selected according to necessity by changing the number of the roll units 10 to be combined. Furthermore, only a roll unit whose surface has been subjected to considerable abrasion, may be replaced so that the surface conditions of the entire width of the roll assembly can be kept in a desirable condition without replacing the complete roll assembly. Moreover, the material of the roll unit may be selected according to the position where the unit is situated so that the wear of the roll may be uniform as a whole.

Third Embodiment

Figure 12:
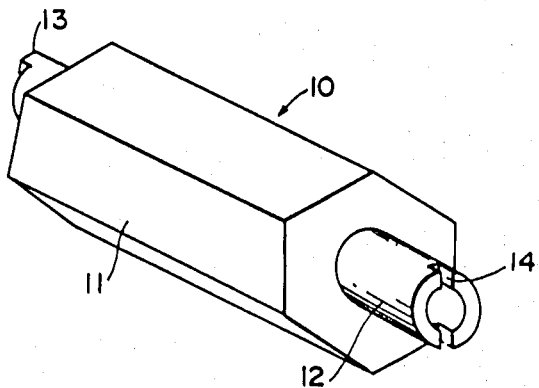
FIG. 12 is a perspective view of a roll unit employable in a third embodiment of the present invention.

Although the contact portion 11 of the roll unit 10 is formed in circle in section in the foregoing embodiments, the configuration of the contact portion 11 is not limited to the circular form, but it may, for example, be polygonal in section as illustrated in FIG. 12.

The polygon selected as an outer peripheral configuration of the contact portion of the roll unit may, for example, be a triangle, a square, a hexagon, an octagon, decagon, etc.

The outer peripheral configuration of the contact portion 11 may further alternatively be of a cocoon, oval, or of a star. The peripheral configuration of the contact portion 11 may further be asymmetrical in section, for example, its sectional configuration may be such that a half is semicircular and the other half is polygonal. When the roll units having such configurations are used for a feed roll, intermittent feeding can be attained and possible slip in the feeding can be prevented.

Moreover, the contact portion 11 of the roll unit 10 may have an outer periphery swollen or bulging at a portion central in the axial direction of the roll unit, if it is preferred according to the use.

In the present embodiment, various anti-slip processing, such as knurling, sand-blasting, may be applied to the surface of the contact portion 11. Alternatively, the surface of the contact portion 11 may be covered with a rubber sheet or felt.

In each of the foregoing embodiments, the material of the roll units 10 may be selected suitably from metal, wood, synthetic resin, according to the use.

As preferred examples of the materials of the roll units 10, it should be mentioned that, for example, composites comprising a synthetic resin or resins and an inorganic filler or fillers and/or a metallic filler or fillers. The compounding ratio of the synthetic resin or resins to the inorganic filler or fillers and/or metallic filler or fillers is, in general, 97 to 30 wt%:3 to 70 wt%.

We claim:
1. A combination roll including:
  (a) a roll shaft having locking end portion; and
  (b) a plurality of roll units, including an end roll unit, mounted on said roll shaft, each of said roll units comprising a roll portion of a first diameter and a shaft inserting portion of a second diameter, said second diameter being less than said first diameter, said roll portion being formed with a contact portion and said shaft inserting portion being concentric with said roll portion and having opposite ends and, at each of said opposite ends, engaging means engageable with a corresponding shaft inserting portion of an adjacent roll unit, said end roll unit having a locking means for locking itself to said locking end portion of said roll shaft so that once said end roll unit is locked to said roll shaft all of the remaining roll units are indirectly locked to said roll shaft by means of said engaging means and all of said roll units are rotatable conjointly with said roll shaft.

2. A combination roll including:
  (a) a roll shaft having a locking end portion; and
  (b) a plurality of roll units, including an end roll unit, mounted on said roll shaft, each of said roll units comprising a roll portion of a first diameter and a shaft inserting portion of a second diameter, said second diameter being less than said first diameter, said roll portion being formed with a contact portion and said shaft inserting portion being concentric with said roll portion and having opposite ends and, at each of said opposite ends, engaging means engageable with a corresponding shaft inserting portion of an adjacent roll unit, said end roll unit having a locking means for locking itself to said locking end portion of said roll shaft so that once said end roll unit is locked to said roll shaft all of the remaining roll units are indirectly locked to said roll shaft by means of said engaging means and all of said roll units are rotatable conjointly with said roll shaft, said contact portion having an anti-slip means which is formed by a composite material exposed on said contact portion, said composite material containing a resin and an inorganic filler.

* * * * *